S. J. KEIM.
Seed-Dropper.

No. 208,825. Patented Oct. 8, 1878.

Witnesses.
John F. Grant
D. Louis Shivers

Inventor.
Simon J. Keim
per Edw Brown
attorney.

UNITED STATES PATENT OFFICE.

SIMON J. KEIM, OF CATASAUQUA, PENNSYLVANIA, ASSIGNOR OF ONE-HALF HIS RIGHT TO WILLIAM YOUNGER, OF SAME PLACE.

IMPROVEMENT IN SEED-DROPPERS.

Specification forming part of Letters Patent No. 208,825, dated October 8, 1878; application filed February 26, 1878.

*To all whom it may concern:*

Be it known that I, SIMON J. KEIM, of Catasauqua, Pennsylvania, have invented a new and useful Improvement in a Seed-Dropper, which improvement is fully set forth in the following specification and accompanying drawings, in which—

Figure 1:
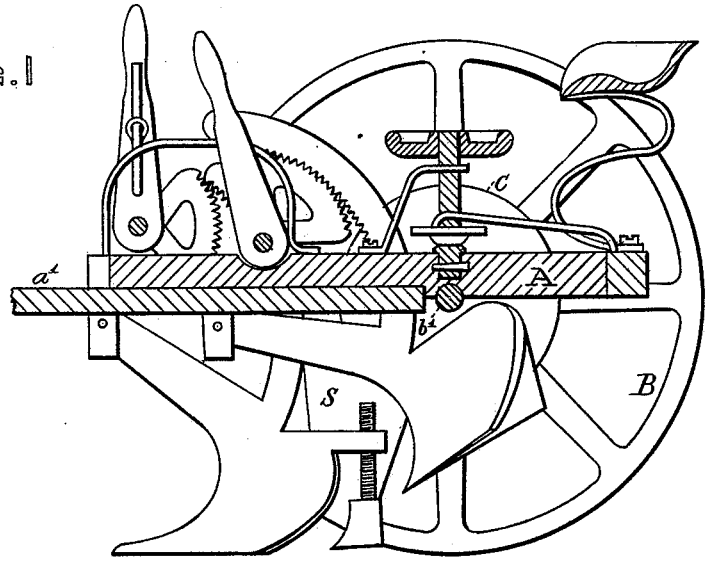
Figure 2:
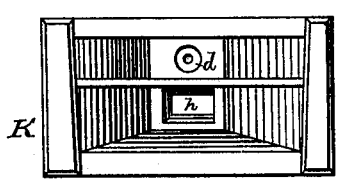
Figure 3:
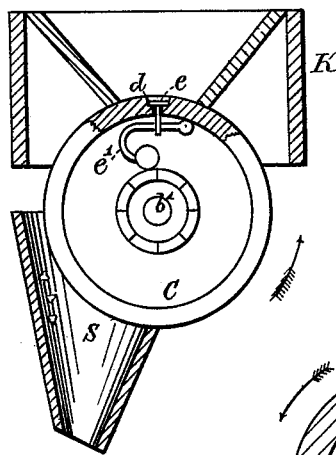
Figure 4:
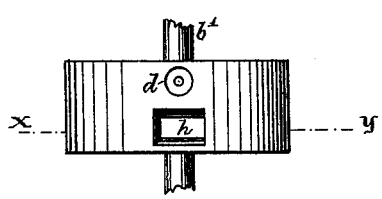
Figure 5:
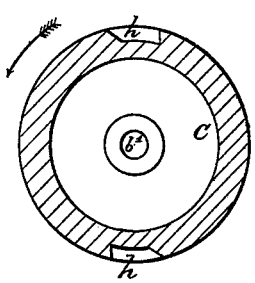

Figure 1 shows a sectional elevation of the wheeled frame for carrying the seed-dropper. Fig. 2 is a plan of the hopper. Fig. 3 is a side elevation of the dropper, with the seed-cup, hopper, and spout in section. Fig. 4 is a plan of the seed-dropper. Fig. 5 is a section on line X Y of Fig. 4.

The nature of my invention consists in the construction of a seed-dropper for planting corn at regular intervals, and in the combination of the same with an apparatus for depositing a fertilizer with the corn planted.

My improvement consists in the form of the rotary drum and pockets, and their combination with a discharger. Also, in the construction of the discharger.

In the drawings, A is the frame, having a pole, $a'$, to which the horses are attached; B, the wheels carrying the whole machine. These wheels are fast to the axle $b'$, which passes through the center of the seed-dropper C. A ratchet operated by a clutch upon the axle throws the seed-dropper in and out of gear.

The seed-dropper is made like a drum or pulley, with its center solid, or with arms. The rim is sufficiently thick, at least in one part, to permit a cup, $d$, to be cast therein. This cup is of sufficient size to admit of the necessary amount of seed to be planted in each hill or drill. Within this cup is a plunger, $e$, the stem of which passes to the interior of the drum, and there connects with a weighted arm, $e'$. On the rim of the drum, and immediately abreast of the cup $d$, is another recess or cup, $h$, for the reception of a fertilizer.

K is the hopper placed over the seed-dropper. It is divided into two parts, one of which contains the seed and the other the fertilizer.

The operation is in this manner: When the cups $d$ and $h$ are at the top they fill with seed and fertilizer, respectively. As the drum rotates the contents of the cups fall into the spout S, and are planted at regular intervals. Should the contents of the cup $d$ stick, the weighted lever $e'$ forces them out as soon as it passes the quarter-turn.

The cups may be partially filled with rings to diminish their capacity.

The side of the hopper over the cup $h$ may be filled with potatoes, the other side being vacant. The machine will then plant potatoes instead of corn or other seed.

I claim—

1. The rotary drum C, having the cup $d$, plunger $e$, and weighted arm $e'$, combined with the hopper K, substantially as specified.

2. The divided hopper K, combined with the rotary drum C, having the fertilizer-receptacle $h$ and the seed-cup $d$, the latter being provided with the plunger $e$ and weighted arm $e'$, substantially as described.

SIMON J. KEIM.

Witnesses:
R. AUG. DONELY,
WM. HAMERSLY.